(12) United States Patent
Shimizu et al.

(10) Patent No.: US 7,023,904 B2
(45) Date of Patent: Apr. 4, 2006

(54) SYNCHRONIZATION TRACKING CIRCUIT

(75) Inventors: Masahiko Shimizu, Kawasaki (JP); Koji Matsuyama, Kawasaki (JP); Yoji Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 792 days.

(21) Appl. No.: 09/804,506

(22) Filed: Mar. 12, 2001

(65) Prior Publication Data
US 2002/0037029 A1    Mar. 28, 2002

(30) Foreign Application Priority Data
Aug. 15, 2000   (JP)   ............................. 2000-246122

(51) Int. Cl.
*H04B 1/69*   (2006.01)
(52) U.S. Cl. .................................................. 375/148
(58) Field of Classification Search ................ 375/130, 375/135, 136, 137, 141, 144, 148, 142, 147, 375/145, 166, 149; 370/320, 355, 441, 342
See application file for complete search history.

(56) References Cited

U.S. PATENT DOCUMENTS

| | | | | |
|---|---|---|---|---|
| 5,659,573 A | * | 8/1997 | Bruckert et al. | ............ 375/142 |
| 6,104,748 A | * | 8/2000 | Kaku | ......................... 375/235 |
| 6,154,487 A | * | 11/2000 | Murai et al. | ................. 375/150 |
| 6,266,365 B1 | * | 7/2001 | Wang et al. | ................. 375/150 |
| 6,333,934 B1 | * | 12/2001 | Miura | ......................... 370/441 |
| 6,370,397 B1 | * | 4/2002 | Popovic et al. | ............. 455/561 |
| 6,438,157 B1 | * | 8/2002 | Mamori | ...................... 375/149 |
| 6,597,676 B1 | * | 7/2003 | Ariyoshi et al. | ............ 370/335 |
| 6,597,727 B1 | * | 7/2003 | Philips et al. | ................ 375/147 |
| 6,628,701 B1 | * | 9/2003 | Yellin | ......................... 375/148 |
| 6,650,692 B1 | * | 11/2003 | Inoue et al. | ................. 375/147 |
| 6,680,981 B1 | * | 1/2004 | Nishizawa | ................... 375/308 |
| 6,697,640 B1 | * | 2/2004 | Katz et al. | ................... 455/561 |
| 6,757,346 B1 | * | 6/2004 | Saito et al. | ................. 375/349 |

FOREIGN PATENT DOCUMENTS

JP          10209918        8/1998

\* cited by examiner

*Primary Examiner*—Emmanuel Bayard
(74) *Attorney, Agent, or Firm*—Katten Muchin Rosenman LLP

(57) ABSTRACT

Disclosed is a synchronization tracking circuit for synchronizing the phase of a despreading code sequence on a receiving side to the phase of a spreading code sequence on a transmitting side. The synchronization tracking circuit has a DLL circuit for performing synchronization tracking by DLL (Delay Locked Loop) control, and an interference-component estimation unit for estimating an interference component inflicted by another path upon a prescribed path of interest among multiple paths. The DLL circuit, which has an interference elimination unit, executes DLL control based upon a signal from which the interference component from the other path has been eliminated and causes the phase of the despreading code sequence on the receiving side to be synchronized with and track the phase of the spreading code on the transmitting side.

6 Claims, 15 Drawing Sheets

FIG. 18 PRIOR ART
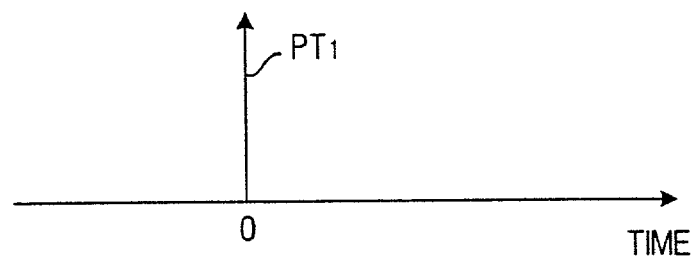
(a)
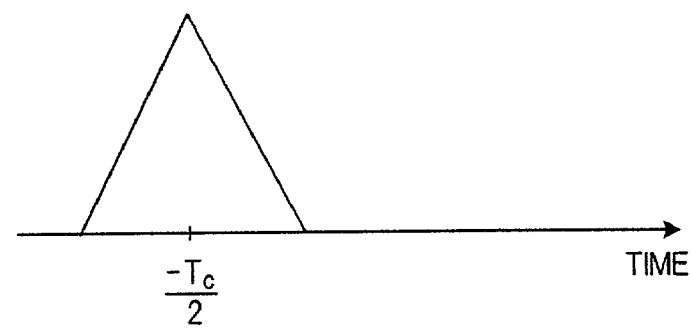
(b)
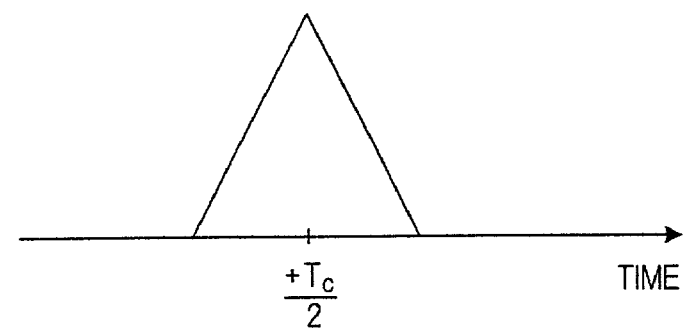
(c)
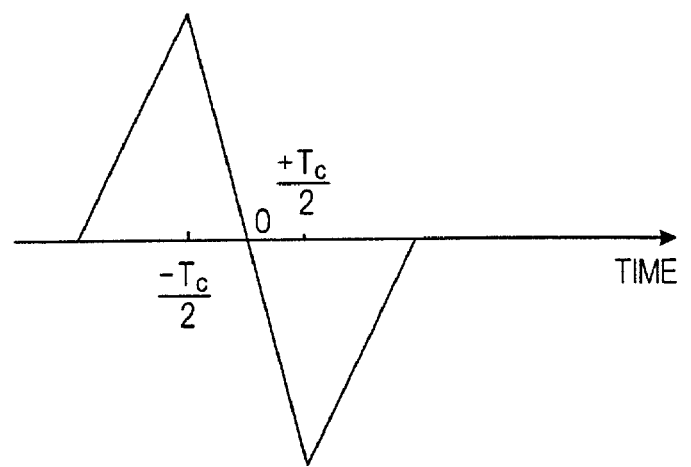
(d)

FIG. 19 PRIOR ART
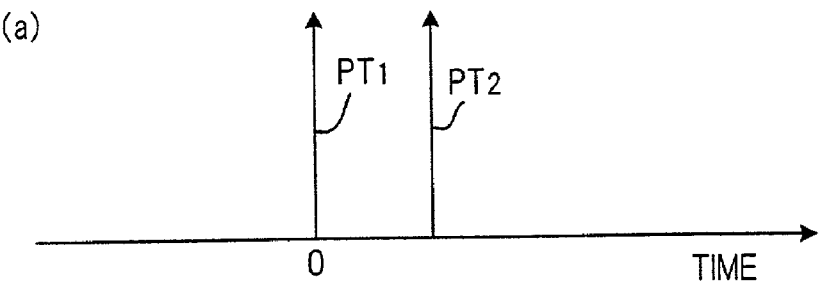
(a)
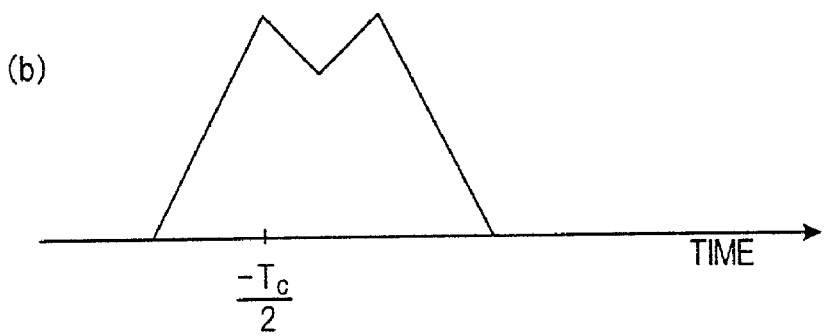
(b)
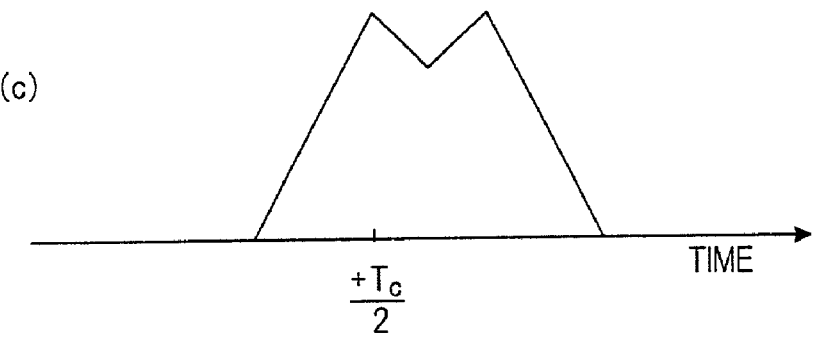
(c)
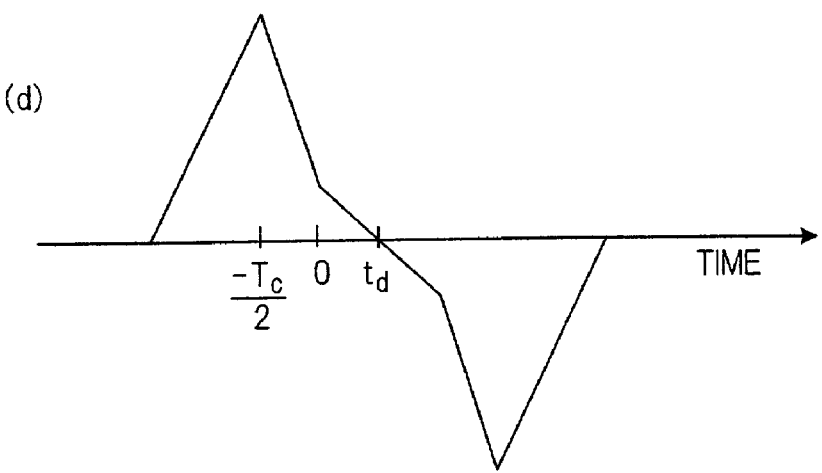
(d)

SYNCHRONIZATION TRACKING CIRCUIT

BACKGROUND OF THE INVENTION

This invention relates to a synchronization tracking circuit for causing the phase of a despreading code sequence on a receiving side to follow up the phase of a spreading code sequence on a transmitting side. More particularly, the invention relates to a synchronization tracking circuit, which is used in the field of CDMA mobile communications employing spread spectrum, for exercising DLL (Delay Locked Loop) control in such a manner that a despreading code sequence on the receiving side will not shift in time with respect to a receive signal for which acquisition of synchronization has succeeded.

In a CDMA (Code Division Multiple Access) mobile communications system using spread spectrum, the transmitting side transmits information upon spreading the information using a spreading code sequence, and the receiving side demodulates the transmit information upon despreading the signal from the transmitting side using a despreading code sequence that is identical with the spreading code sequence.

FIG. 12 is a block diagram illustrating the construction of a CDMA receiver. The receiver includes a radio unit 1 that subjects a high-frequency signal received by an antenna ANT to a frequency conversion (RF→ IF conversion) to obtain baseband signals. A quadrature detector 2 subjects the baseband signals to quadrature detection and outputs in-phase component (I component) data and quadrature component (Q component) data. The quadrature detector 2 includes a receive carrier generator 2a, a phase shifter 2b for shifting the phase of the receive carrier by $\pi/2$, and multipliers 2c, 2d for multiplying the baseband signals by the receive carrier and outputting the I-component and Q-component signals. Low-pass filters (LPF) 3a, 3b limit the bands of the output signals and A/D converters 4a, 4b convert the I- and Q-component signals, respectively, to digital signals. The digital signals are input to a searcher 5 and to each of fingers $6_1$ to $6_4$.

If a direct sequence signal (DS signal) that has experienced multipath effects is input to the searcher 5, the latter executes autocorrelation processing using a matched filter (not shown), detects multipath and inputs, to the fingers $6_1$ to $6_4$, despreading-start timing data $\tau_0$ to $\tau_3$, respectively, and delay-time adjustment data for the respective paths. Each of the fingers $6_1$ to $6_4$ has a despreading code generator 6a for generating a code sequence identical with the spreading code sequence on the transmitting side based upon the timing data $\tau_0$ to $\tau_3$ that enters from the searcher 5. More specifically, the searcher 5 detects the phase of the transmitting-side spreading code (referred to as "synchronization capture") at a precision of within one chip, and the despreading code generator 6a generates a despreading code sequence, which is for performing despreading on the receiving side, in sync with the detected phase. A DLL (Delay Locked Loop) circuit 6b exercises control (referred to as "synchronization tracking") in such a manner that the despreading code sequence on the receiving side will not develop a time shift with respect to a receive signal for which synchronization has been captured even if the receive signal undergoes a change in phase owing to the effects of modulation and noise, etc.

Each finger further includes a despreader/delay-time adjustment unit 6c for performing dump integration by subjecting a direct wave or a delayed wave that arrives via a prescribed path to despread processing using a code identical with the spreading code, and for subsequently applying delay processing that conforms to the path and outputting a pilot signal (reference signal) and information signal; a phase compensator (channel estimation unit) 6d for averaging voltages of the I and Q components of the pilot signal over a prescribed number of slots and outputting channel estimation signals It, Qt; and a synchronous detector 6e for restoring the phases of despread information signals I', Q' to the original phases based upon a phase difference $\theta$ between a pilot signal contained in a receive signal and an already existing pilot signal. More specifically, the channel estimation signals It, Qt are cosine and sine components of the phase difference $\theta$, and therefore the synchronous detector 6e demodulates the receive information signal (I,Q) (performs synchronous detection) by applying phase rotation processing to the receive information signal (I',Q') in accordance with the following equation using the channel estimation signal (It,Qt):

$$\begin{pmatrix} I \\ Q \end{pmatrix} = \begin{pmatrix} It & Qt \\ -Qt & It \end{pmatrix} \begin{pmatrix} I' \\ Q' \end{pmatrix}$$

A rake combiner 7 combines signals output from the fingers $6_1$ to $6_4$ and outputs the combined signals to an error correction decoder 8 as a soft-decision data sequence. The error correction decoder 8 applies error correction processing, demodulates the transmit information and outputs the demodulated signal.

DLL Circuit

As mentioned above, a CDMA receiver has a searcher for detecting the phase of the transmitting-side spreading code (referred to as "synchronization capture") at a precision of within one chip, after which a despreading code sequence, which is for performing despreading on the receiving side, is generated in sync with the detected phase. The DLL carries out control (synchronization tracking) in such a manner that the despreading code sequence on the receiving side will not develop a time shift with respect to a receive signal for which synchronization has been captured even if the receive signal undergoes a change in phase owing to the effects of modulation and noise, etc.

FIG. 13 is a diagram illustrating the construction of a DLL circuit 6b to which a despreading code generator 6a is connected. The despreading code generator 6a includes a PN generator 6a-1 for generating a despreading code sequence (first PN sequence) $A_1$, which is an M sequence. The first PN sequence $A_1$ is composed of N chips and is generated cyclically at the symbol period T ($=N \times T_C$, where $T_C$ represents the chip cycle). The PN generator 6a-1 further includes a voltage-controlled oscillator (VCO) 6a-2 that is capable of varying the clock frequency (chip frequency) based upon the output of the DLL circuit 6b. The latter includes a delay circuit 6b-1 for delaying the first PN sequence $A_1$ by one chip cycle and outputting a second PN sequence $A_2$; a despreader (multiplier) 6b-2 for multiplying, chip by chip, the first PN sequence $A_1$ output by the PN generator 6a-1 and a receive spread-spectrum data sequence B to thereby effect despreading; a despreader (multiplier) 6b-3 for multiplying, chip by chip, the second PN sequence $A_2$ delayed by one chip and the receive spread-spectrum data sequence B to thereby effect despreading; and adder 6b-4 for adding the output of the despreader 6b-2 and a signal obtained by inverting the code output by the despreader 6b-3; and an integrating circuit (low-pass filter) 6b-5.

The DLL circuit shown in FIG. 13 delays the despreading code sequence $A_1$ to generate the despreading code sequence $A_2$ the phase whereof differs by one chip, and uses the despreading code sequences $A_1$, $A_2$ to apply despread processing to the receive data sequence B. However, the DLL circuit can be constructed as shown in FIG. 14. Here the DLL circuit is constructed in such a manner that the receive data sequence B is delayed by a delay circuit 6b-1' to generate receive data sequence B' the phase whereof differs by one chip, and the despreading code sequence A is used to apply despread processing to the receive data sequence B, B'.

The despreader 6b-2 and low-pass filter 6b-5 in FIG. 13 function to calculate the correlation between the first PN sequence $A_1$ and the receive data sequence B. If the phase of the first PN sequence $A_1$ and the phase of the receive data sequence B match, the maximum output is obtained and, as shown in FIG. 15A, a correlation value $R(\tau)=1$ having the width of one chip cycle is output every symbol. If the phase shifts by one chip cycle or more, the correlation value $R(\tau)$ becomes 1/N. The despreader 6b-3 and low-pass filter 6b-5 function to calculate the correlation between the second PN sequence $A_2$ delayed by one chip cycle and the receive data sequence B. If the phase of the second PN sequence and the phase of the receive data sequence B match, the maximum output is obtained and a correlation value $R(\tau)$ shown in FIG. 15B is output. If the phase shifts by one chip cycle or more, the correlation value $R(\tau)$ becomes 1/N. The adder 6b-4 adds the output of the despreader 6b-2 and a signal obtained by inverting the code output by the despreader 6b-3. As a result, a signal having an S-curve characteristic shown in FIG. 15C with respect to a phase difference T is output via the low-pass filter 6b-5.

On the basis of the output of the low-pass filter, the voltage-controlled oscillator 6a-2 of the despreading code generator 6a controls the clock frequency in such a manner that the phase difference T becomes zero. For example, if the phase of the PN sequence (despreading code) leads that of the transmitting-side spreading code contained in the receive data sequence, control is performed so as to make the phase difference zero by lowering the clock frequency. If the phase of the PN sequence (despreading code) lags behind that of the transmitting-side spreading code, control is performed so as to make the phase difference zero by raising the clock frequency.

The DLL circuit 6b in this spread-spectrum system performs despreading at a timing equivalent to the phase difference $\tau$ of $\pm 0.5$ chip ($=\pm T_c/2$) with respect to the timing of the desired signal (the spreading code sequence on the transmitting side), obtains the power difference between the signals despread at the respective timings and decides phase advance/delay of the PN sequence (despreading code) based upon the sign (positive or negative) of the power difference, thereby performing path tracking. The timing equivalent to $\tau=-T_c/2$ shall be referred to as "early timing" and the timing equivalent to $\tau=+T_c/2$ shall be referred to as "late timing".

In the DLL circuits described above, the receive data sequence is described separately for I and Q channels. In actuality, however, the receive data sequence is divided into the I and Q channels and then input to the DLL circuit. FIG. 16 illustrates an example of the construction of a DLL circuit that takes both the I and Q channels into consideration. Components in FIG. 16 identical with those shown in FIG. 12 are designated by like reference characters. The DLL circuit 6b includes delay circuits 6b-1i, 6b-1q for delaying receive data sequences $B_I$, $B_Q$ of I and Q channels, respectively, by one chip cycle and outputting delayed receive data sequences $B_I'$, $B_Q'$; despreaders (multipliers) 6b-2i, 6b-2q for multiplying, chip by chip, I- and Q-channel despreading code sequences $A_I$, $A_Q$, which are output by the despreading code generator 6a, by the receive data sequences $B_I'$, $B_Q'$ to thereby effect despreading; and despreaders (multipliers) 6b-3i, 6b-3q for multiplying, chip by chip, the I- and Q-channel despreading code sequences $A_I$, $A_Q$ by the delayed receive data sequences $B_I'$, $B_Q'$, which are output from the delay circuits, to thereby effect despreading.

A power calculation unit 6b-6 integrates the despread signals from the despreaders 6b-2i, 2b-2q over one symbol period, squares the outputs of the integrators and sums the squares to calculate the power value of the despread signals at the early timing. Similarly, a power calculation unit 6b-7 integrates the despread signals from the despreaders 6b-3i, 6b-3q over one symbol period, squares the outputs of the integrators and sums the squares to calculate the power value of the despread signals at the late timing.

An adder 6b-4 calculates the difference between the power value of the despread signals at the early timing and the power value of the despread signals at the late timing, and an advance/delay decision unit 6b-5 instructs the despreading code generator 6a to advance/delay the phase of the despreading code sequence based upon an output X from the adder 64-b. For example, let TH represent a threshold value. If the adder output X is positive and |X|>TH holds, the despreading code generator 6a is instructed to advance the phase of the despreading code sequence; if the adder output X is negative and |X|>TH holds, the despreading code generator 6a is instructed to delay the phase of the despreading code sequence.

FIG. 17 is a diagram expressing FIG. 16 in simplified form. In the description that follows, the DLL circuit will be expressed using this diagram. Furthermore, the despreader 6b-2 performs despreading at the early timing and the despreader 6b-3 performs despreading at the late timing.

An example of the DLL will be described for a case where an M sequence of one symbol period is used and the phase difference $\tau$ is $\pm 0.5$ chip. However, this is not the only arrangement that is possible.

In a multipath environment, one path interferes with another path if the delay between the paths (the delay time difference between the paths) is too small. As a consequence, the power of a signal despread at whichever of the early and late timings is nearer the timing of the other path becomes too large and results in a DLL control malfunction.

By way of example, if a path $PT_1$ at timing 0 in (a) of FIG. 18 is not interfered with by another path, the despread signals at the early timing ($=-T_c/2$) and late timing ($=+T_c/2$) become as shown at (b) and (c) of FIG. 18, respectively, and the S curve becomes zero at time t =0 as indicated at (d) in FIG. 18. Accordingly, if DLL control is carried out so as to eliminate the difference between the despread signal at the early timing and the despread signal at the late timing, synchronization tracking can be achieved at a precision of within one chip. However, if the path $PT_1$ at timing 0 is interfered with by another nearby path $PT_2$, as shown in (a) of FIG. 19, the despread signals at the early timing ($=-T_c/2$) and late timing ($=+T_c/2$) become as shown at (b) and (c) of FIG. 19, respectively. The result is a distorted S curve, which becomes zero at time $t=t_d$ and not at t=0, as indicated at (d) in FIG. 19. Consequently, if DLL control is performed so as to eliminate the difference between the despread signal at the early timing and the despread signal at the late timing, the despreading code sequence will be generated at a timing offset from the original timing by td. The result is a malfunction.

SUMMARY OF THE INVENTION

Accordingly, an object of the present invention is to so arrange it that correct synchronization tracking can be achieved by eliminating the interference component inflicted upon a path of interest by another path in a multipath environment.

According to the present invention, the foregoing object is attained by a synchronization tracking circuit for synchronizing the phase of a despreading code sequence on a receiving side to the phase of a spreading code sequence on a transmitting side, comprising: a DLL circuit for performing synchronization tracking on a prescribed path of interest among multipaths by DLL control; and an interference-component estimation unit for estimating an interference component inflicted by another path upon the prescribed path of interest in a multipath environment; wherein the DLL circuit eliminates the estimated interference component from a despread signal obtained by despreading a receive signal and controls the phase of the despreading code sequence on the receiving side based upon a signal obtained by elimination of the interference component.

The interference-component estimation unit estimates the interference component inflicted by the other path upon the path of interest based upon (1) a channel estimation value of the other path, (2) an interpath delay-time difference between the other path and the path of interest, and (3) impulse response of the overall transceiver.

Thus, in accordance with the synchronization tracking circuit of the present invention, DLL control is performed upon eliminating an interference component that another path inflicts upon a prescribed path of interest in a multipath environment. This makes it possible to achieve correct synchronization tracking.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 is a diagram useful in describing S curves in a case where there is no interference between paths; and FIG. 19 is a diagram useful in describing S curves in a case where there is interference between paths.

Figure 1:
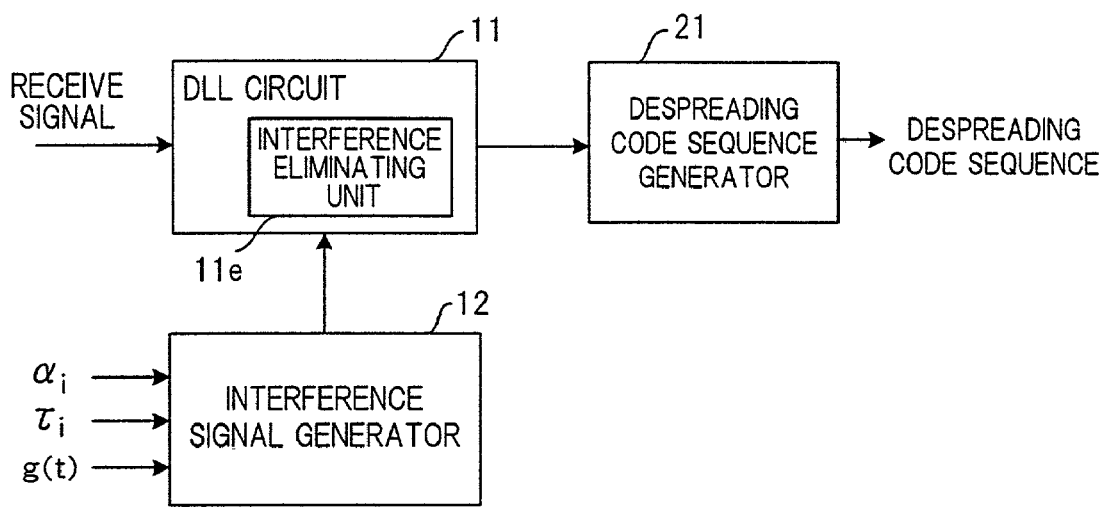
FIG. 1 is a block diagram illustrating an overview of the present invention.

DESCRIPTION OF THE PREFERRED EMBODIMENTS (A) Principles and Overview of the Present Invention When a signal that has traversed an ideal propagation path (namely a path of the type along which a transmitted signal is received as is) is filtered by a receive filter, the output signal $v_1(t)$ of the receive filter is expressed as follows:

$$v_1(t) = \sum_{n=-\infty}^{+\infty} a_n \sum_{k=0}^{N-1} p_{k+nN} g[t-(k+nN)T] \quad (1)$$

where $a_n$ represents the transmit data (1 or −1), $P_n$ the spreading code (1 or −1), g(t) total impulse response (see FIG. 2) from an input of a transmitter to an output at a receiver, T the chip length (chip cycle) and N a spreading ratio. Further, transmit data $a_0$ at n=0 is transmit data at the present time, and spreading code sequences at this time $p_0$, $P_1, P_2, \ldots, P_{N-1}$.

If this receive signal is despread by a spreading code (=despreading code sequence) $P_n$, the signal becomes as follows:

$$v_2(t) = \frac{1}{N} \sum_{l=0}^{N-1} p_l v(t+lT) \quad (2)$$

$$v_2(t) = \frac{1}{N} \sum_{n=-\infty}^{+\infty} a_n \sum_{l=0}^{N-1} p_l \sum_{k=0}^{N-1} p_{k+nN} g[t-(k-l+nN)T] \quad (3)$$

The signal can be written as follows by splitting it into a desired signal component and an interference component:

$$v_2(t) = a_0 g(t) + I(t) \quad (4)$$

The desired signal component, which is the first term on the right side of Equation (4), is that for which n=0, k=l holds in Equation (3). The desired signal component is written as follows:

$$\frac{1}{N} a_0 \sum_{i=0}^{N-1} p_k^2 g(t) = \frac{1}{N} a_0 \sum_{k=0}^{N-1} g(t) = a_0 g(t) \quad (5)$$

The interference signal component I(t), which is the second term on the right side of Equation (4), is a signal obtained when the case n=0, k=1 is excluded from holding in Equation (3). The interference signal component is written as follows:

$$I(t) = \frac{1}{N} a_0 \sum_{i=0}^{N-1} p_l \sum_{\substack{k=0 \\ k \neq l}}^{N-1} p_k g[t - (k-l)T] + \frac{1}{N} \sum_{n \neq 0} a_n \sum_{i=0}^{N-1} p_l \sum_{k=0}^{N-1} p_{k+nN} g[t - (k - l + nN)T] \quad (6)$$

In I(t), no multiplication takes place between despreading codes of the same number and therefore it is considered that the product of despreading codes takes on a value of 1 or −1 randomly at a 50—50 probability.

Accordingly, the average power of the interference signal I(t) becomes as follows:

$$P_I = \langle |I(t)|^2 \rangle = (1/N) \Sigma_{k=0} |g(t-kT)|^2 \quad (7)$$

so that the power becomes 1/(spreading ratio) of the power that prevailed prior to despreading.

The main component of an interference signal from another path is the product of the value $\alpha_i$ of the channel (transmission path) and impulse response $g(t-\tau_i)$ that takes into consideration the interpath delay time $\tau_i$ between the path of interest and the other path. The "value" of the channel refers to a quantity that indicates how much attenuation and rotation of phase a signal sustains by transmission along the transmission path. If a despread signal that includes an interference signal from another path is written in the form of a calculation formula, then it can be written as follows from Equation (4):

$$v(t) = \sum_i \alpha_i [a_0 g(t - \tau_i) + I_i] \quad (8)$$

where g(t) represents the total impulse response of the transceiver, $a_0$ the transmit data (1 or −1), $\alpha_i$ the value of the channel (channel estimation value) of path i, $\tau_i$ the delay time of path i from a path 0 of interest, and $I_i$ the interference component produced when despreading is performed. The interference component $I_i$ is the chip-to-chip interference component produced by the band limitation of a filter or the like and takes on a power of 1/(spreading ratio) owing to despreading, in accordance with Equation (7). The power of the desired signal, however, is assumed to be unchanged by despreading.

Transforming Equation (8) gives us $$v(t) = \alpha_0 [a_0 g(t-\tau_0) + I_0] + \Sigma_{i \neq 0} \alpha_i [a_0 g(t-\tau_i) + I_i] \quad (8)'$$

Figure 2:
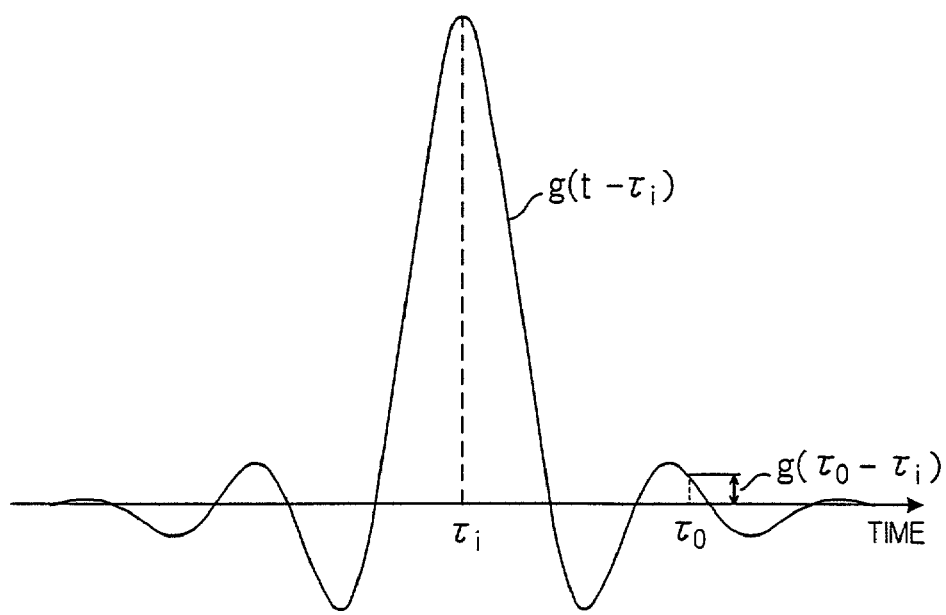
FIG. 2 is a waveform diagram of impulse response.

Accordingly, if despreading is performed at the timing $\tau_0$ of the path 0 (i=0), i.e., at the timing $t=\tau_0$, then we have $$v(\tau_0) = a_0 [a_0 g(0) + I_0] + \sum_{i \neq 0} \alpha_i [a_0 g(\tau_0 - \tau_i) + I_i] \quad (9)$$

where $\alpha_0 a_0 g(0)$ represents the desired signal component. The design is such that the impulse response $g(t-\tau_i)$ takes on the maximum value at $t=\tau_i$, as shown in FIG. 2, with the amplitude becoming small in terms of average as t departs from $\tau_i$. In a multipath environment, therefore, if the spacing between paths is small (i.e., if $\tau_0-\tau_i$) is small, the amplitude of the impulse response $g(\tau_0-\tau_i)$ becomes large and path interference from an ith path takes on a large value. FIG. 2 illustrates the interference component $g(\tau_0-\tau_i)$ inflicted by path i on path 0. If the time interval between early timing and late timing in the case of a DLL circuit is represented by $T_c$, the interference from the ith path (path i) will be $g(\tau_0-\tau_i-T_c/2)$ and $g(\tau_0-\tau_i+T_c/2)$ at the early timing and late timing, respectively, and the problem illustrated in FIG. 19 arises as a result.

Accordingly, the channel estimation value $\alpha_i$ and path timings $\tau_0$, $\tau_i$ are utilized to estimate the interference component $\Sigma_{i \neq 0} \alpha_i a_0 g(\tau_0-\tau_i)$, and this is subtracted from the despread signal of Equation (8), thereby eliminating the interference component. The channel estimation value $\alpha_i$ is found in the same manner as the channel estimation value used in synchronous detection performed by a CDMA receiver. Further, the path timings $\tau_0$, $\tau_i$ employ the immediately preceding timings (the timings of the immediately preceding symbol) found by the DLL circuit. The impulse response g(t) is a value that is fixed for the particular transceiver. Use is made of a previously measured value or design value and the value is stored in a memory such as a ROM. Thus, a channel estimation value, path timings and impulse response of the overall transceiver are utilized to estimate the interference component, which is then eliminated. As a result, the DLL circuit is allowed to operate based upon the signal solely of the path of interest and it is possible to perform path tracking normally.

FIG. 1 is a block diagram illustrating an overview of the present invention. Here a DLL circuit 11 controls the phase of a despreading code sequence by DLL control and includes an interference eliminating unit 11e. A despreading code sequence generator 21 generates a despreading code sequence at a timing instructed by a searcher (matched filter), not shown, and advances or delays the phase of the despreading code sequence in accordance with a phase advance/delay command from the DLL circuit 11. An interference signal generator 12 estimates the interference component $\Sigma_{i \neq 0} \alpha_i a_0 g(\tau_0-\tau_i)$ using the channel estimation value $\alpha_i$, path timings $\tau_0$, $\tau_i$ and impulse response g(t) (FIG. 2) of the overall transceiver, and inputs this component to the DLL circuit 11. The interference eliminating unit 11e eliminates the interference component from the despread signal obtained by despreading the receive signal, and the DLL circuit 11 eliminates the interference component, as a result of which DLL control can be carried out based upon the signal solely of the path of interest. This makes normal path tracking possible.

(B) EMBODIMENTS

(a) First Embodiment

Figure 3:
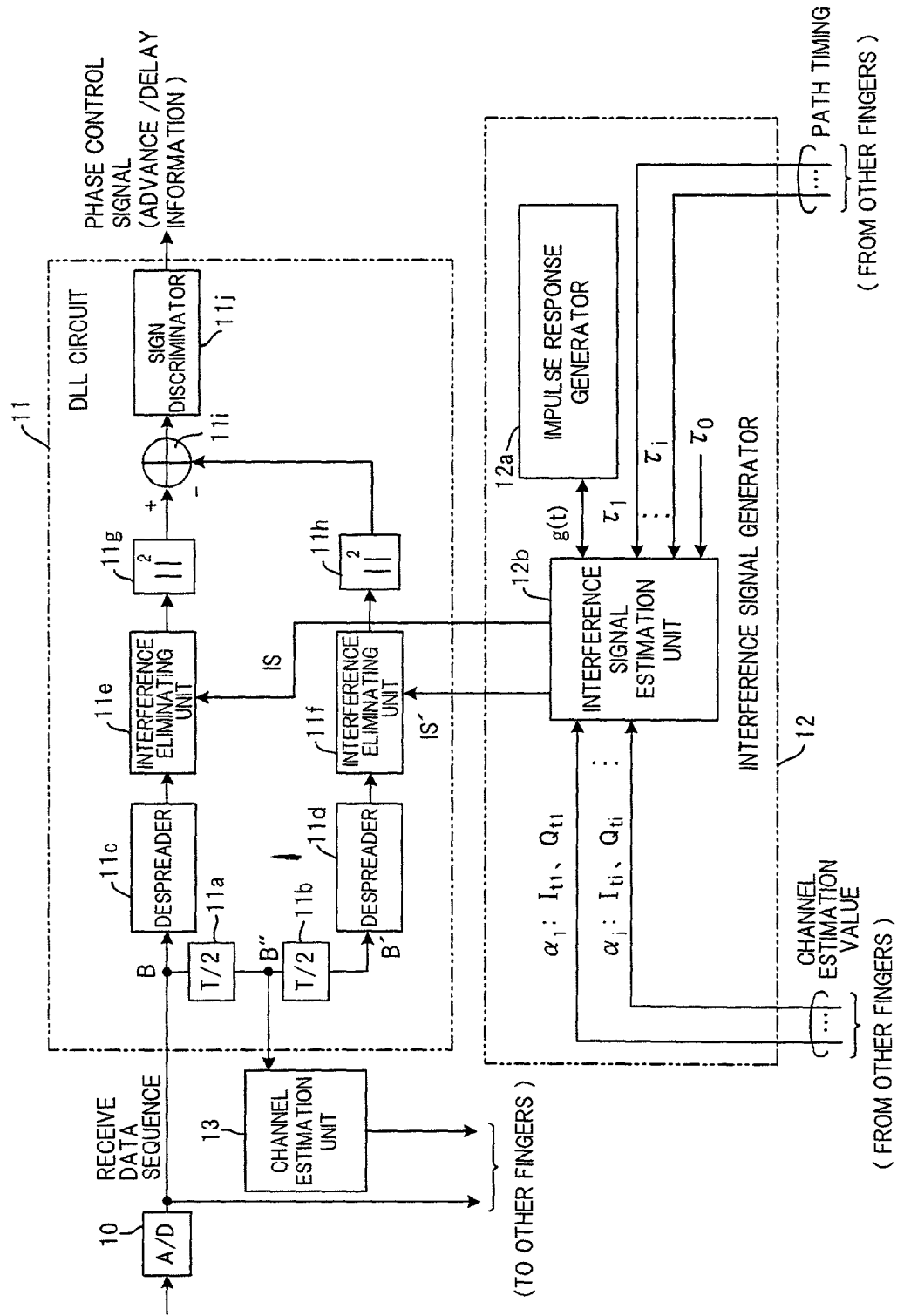
FIG. 3 is a block diagram illustrating a first embodiment of a synchronization tracking circuit according to the present invention.
Figure 17:
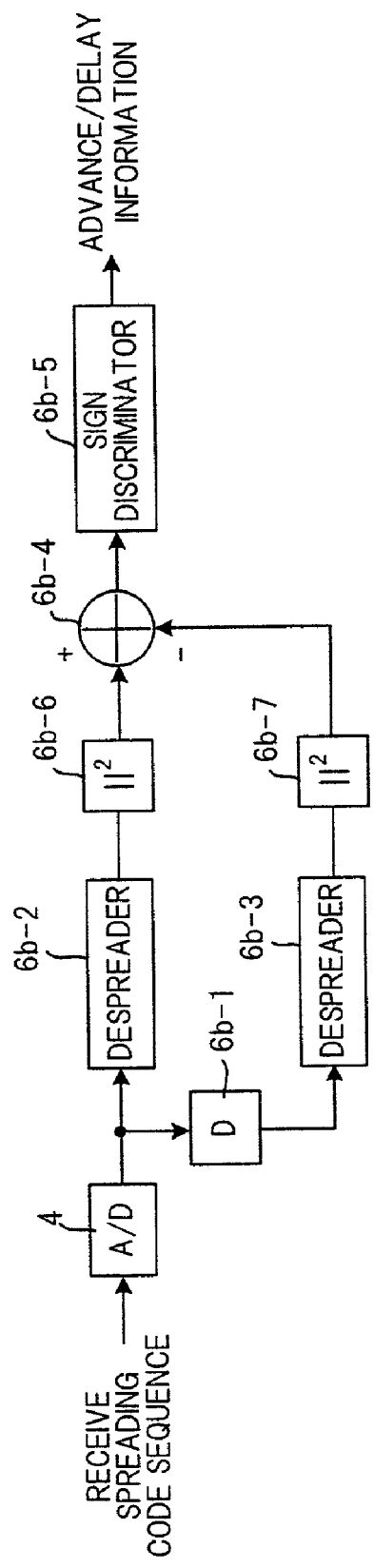
FIG. 17 is a block diagram of a prior-art DLL circuit expressed by simplifying FIG. 16.

FIG. 3 is a block diagram illustrating a first embodiment of a synchronization tracking circuit according to the present invention. The DLL circuit is expressed in simplified form in a manner similar to that of FIG. 17. Accordingly, the signals of various components up to input to a power calculation section in the DLL circuit are complex signals.

The signal received by the radio receiving unit of a CMDA receiver is converted to digital data by an A/D converter 10, and the digital data generated by the conversion is input as a receive data sequence B to the DLL circuit 11 of the path of interest. The receive data sequence B corresponds to spread data obtained by spreading transmit data by a spreading code on the transmitting side. The interference signal generator 12 estimates an interference component that is inflicted upon a prescribed path of interest by another path in a multipath environment and inputs this interference component to the DLL circuit 11. More specifically, the interference signal generator 12 estimates the interference component inflicted by the other path upon the path of interest based upon (1) a channel estimation value of the other path, (2) a delay time difference between the other path and the path of interest, and (3) impulse response of the overall transceiver. The DLL circuit 11 eliminates the interference component, which is inflicted by the other path, from the despread signal obtained by despreading the receive data sequence, and outputs a signal PCS for controlling the phase of the despreading code sequence on the receiving side based upon the signal obtained. A channel estimation unit 13 uses a data sequence B'', which is obtained by delaying the receive data by $T_c/2$, to obtain a channel estimation value through a method similar to that used in channel estimation in synchronous detection, and inputs the channel estimation value to the interference signal generator of the other path.

The DLL circuit 11 includes delay circuits 11a, 11b for delaying the receive data sequence B by $T_c/2$ (where Tc represents the chip cycle) at a time, a first despreader 11c for despreading the receive data sequence B using a despreading code sequence, and a second despreader 11d for despreading a receive data sequence B', which has been delayed by a total delay of $T_c$, using a despreading code sequence. If timing that follows the timing of the receive data sequence B by the time $T_c/2$ is regarded as the timing of the spreading code on the transmitting side, then the first despreader 11c despreads the receive data at a timing (early timing) advanced in phase by $T_c/2$ relative to the timing of the spreading code sequence on the transmitting side, and the second despreader 11d despreads the receive data at a timing (late timing) delayed in phase by $T_c/2$ relative to the timing of the spreading code sequence on the transmitting side.

The DLL circuit 11 further includes the interference eliminating unit 11e for eliminating interference received from another path by subtracting an interference component IS from the despread signal of the early timing, and an interference eliminating unit 11f for eliminating interference received from the other path by subtracting an interference component IS' from the despread signal of the late timing. The interference signals IS, IS' both are interference signals which other the other path inflicts upon the path of interest but the values of these signals differ. The reason for this is as follows: If we let $\tau_0$ represent the timing (path timing) of a desired signal on the path of interest, the first despreader 11c despreads the receive data at the timing (early timing) of $(\tau_0-T_c/2)$, and the second despreader 11d despreads the receive data at the timing (late timing) of $(\tau_0+T_c/2)$. Accordingly, if we let $\tau_i$ represent the path timing of another path, the delay time from the path timing of the other path to the early timing of the first despreader 11c will be $(\tau i-\tau_0+T_c/2)$, and the delay time from the path timing of the other path to the late timing of the second despreader 11d will be $(\tau i-\tau_0-T_c/2)$. Thus the delay times are different. As a consequence, the interference signals IS, IS' that depend upon the delay time difference between the other path and the path of interest have different values.

The DLL circuit 11 further includes a power calculation unit 11g for calculating the power of the signal obtained by eliminating the interference signal IS from the despread signal of the early timing, a power calculation unit $11_h$ for calculating the power of the signal obtained by eliminating the interference signal IS' from the despread signal of the late timing, an arithmetic unit $11_i$ for calculating the power difference, and a sign discrimination unit $11_j$ for outputting a phase control signal PCS that controls the phase of the despreading code sequence on the receiving side based upon the power difference. If the sign discrimination unit $11_j$ discriminates a positive sign, it outputs a phase control signal PCS that retards the phase of the despreading code sequence on the receiving side in such a manner that the power difference will become zero; if the sign discrimination unit 11j discriminates a negative sign, it outputs a phase control signal PCS that advances the phase of the despreading code sequence on the receiving side in such a manner that the power difference will become zero.

Figure 4:
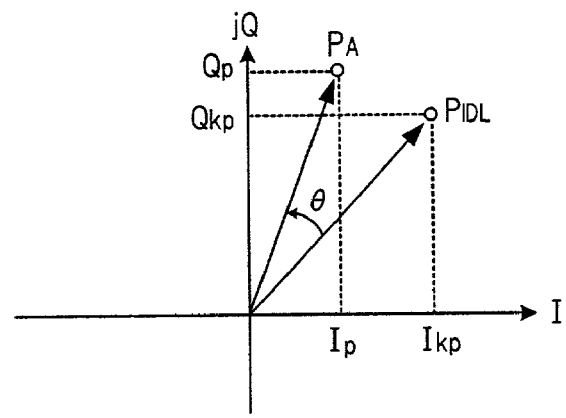
FIG. 4 is a diagram useful in describing phase rotation of a pilot symbol.
Figure 5:
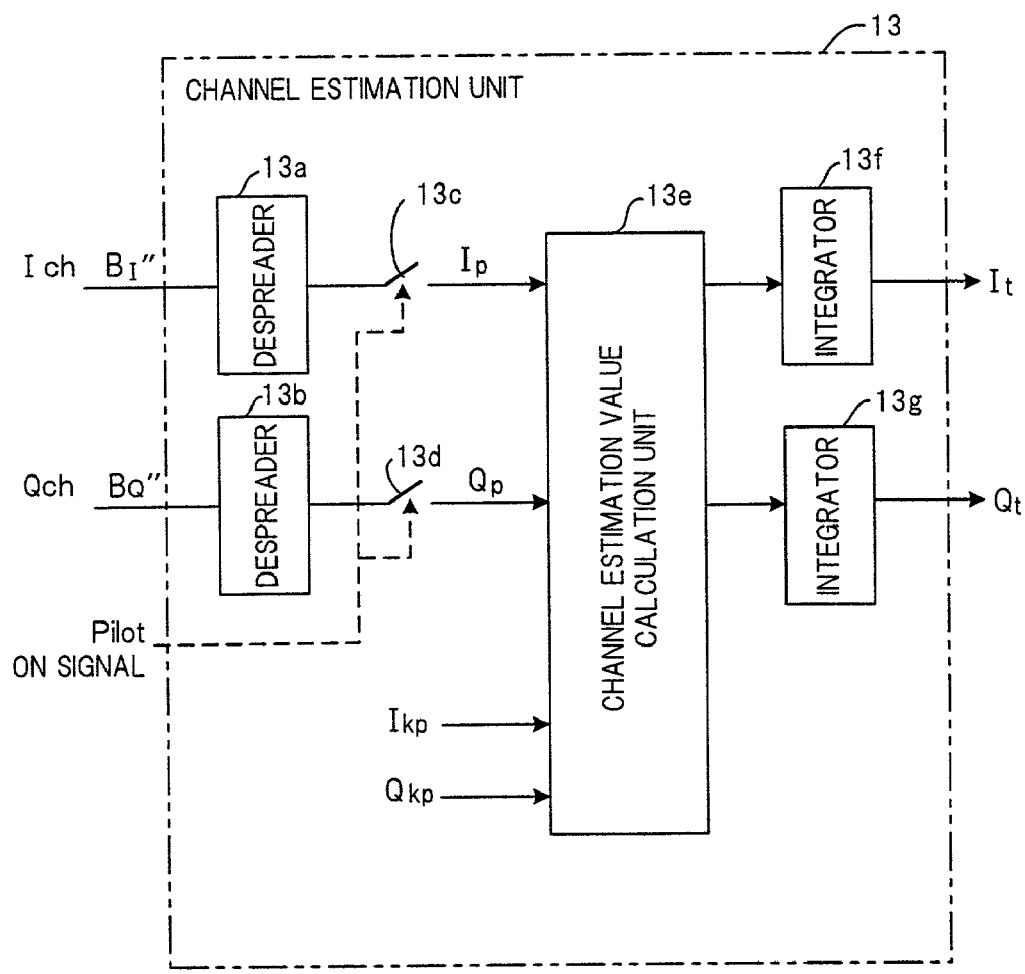
FIG. 5 is a block diagram illustrating a channel estimation unit.

The channel estimation unit 13 obtains a channel estimation value through a method similar to that used for channel estimation is synchronous detection. In CDMA communication, a pilot symbol P undergoes rotation of phase owing to transmission. If a signal point position vector $P_A$ (see FIG. 4) of this signal is known on the receiving side, then the phase rotation angle θ and amplitude attenuation of the symbol resulting from transmission can be obtained because an ideal signal point position vector PIDL of the pilot symbol is already known. The phase rotation angle θ and attenuation become the channel estimation values. FIG. 5 is a block diagram illustrating the channel estimation unit 13. The latter includes despreaders 13a, 13b for respectively despreading I- and Q-channel sequences $B_I''$, $B_Q''$ of a data sequence, which is obtained by delaying the receive data sequence B by $T_c/2$, by I- and Q-channel despreading code sequences on the receiving side. Switches 13c, 13d are closed by at the pilot receive timing, whereby I- and Q-channel components Ip, Qp of the pilot symbol are input to a channel estimation value calculation unit 13e. Whenever the I- and Q-channel components Ip, Qp of the pilot symbol enter, the channel estimation value calculation unit 13e uses these signals and I- and Q-channel components Ikp, Qkp of an already known pilot symbol to calculate I- and Q-channel components of the channel estimation signal. Integrators 13f and 13g average the I- and Q-channel components, respectively, and output channel estimation values It and Qt, respectively.

The interference signal generator 12 generates the interference components IS, IS' inflicted upon a path $PT_0$ of interest by another path $PT_i$(i=1, 2, . . . ). The interference components inflicted upon a path $PT_0$ of interest by another path $PT_i$ are $\alpha_i a_0 g(\tau_0-\tau_i)$, as indicated by Equation (9), where $a_0$ represents the transmit data (1 or −1), $\alpha_i$ the channel estimation value (=Iti+jQti) of path $PT_i$, $\tau_0$ the path timing of the path $PT_0$ of interest, $\tau_i$(i=1, 2, . . . ) the path timing of path $PT_i$, $(\tau_c-\tau_i)$ the delay time from path $PT_0$ to path $PT_i$, and g(t) the impulse response.

An impulse response generator 12a stores the correspondence between times and impulse response values (see FIG. 2) discretely in a storage unit such as a ROM or RAM, reads an impulse response value $g(\tau_0-\tau_i)$, which conforms to a delay time difference $(\tau_0-\tau_i)$ requested from an interference signal estimation unit 12b, out of the storage unit and outputs this impulse response value. The interference signal estimation unit 12b uses channel estimation values $\alpha_i(i=1, 2, \ldots)$, path timing $\tau_i$ and impulse response value g(t), which enter from other fingers, to estimate the interference signal IS of the early timing and the interference signal IS' of the late timing, and outputs these interference signals.

The interference signal IS is estimated in accordance with $$IS=\Sigma_i\alpha_i a_0 g(\tau_0-\tau_i+T_c/2) i=1, 2, \ldots \quad (10)$$

and the interference signal IS' is estimated in accordance with $$IS'=\Sigma_i\alpha_i a_0 g(\tau_0-\tau_i-T_c/2) i=1, 2, \ldots \quad (10)'$$

Thus, in accordance with the first embodiment, the interference component which another path inflicts upon a path of interest is estimated by utilizing a channel estimation value $\alpha_i$, path timing $\tau_i$ and impulse response value g(t) of the overall transceiver, and DLL control is carried out upon eliminating this interference component from the receive signal. As a result, DLL control can be carried out based upon a signal solely of a path of interest. This makes normal path tracking possible.

(b) Second Embodiment

Figure 6:
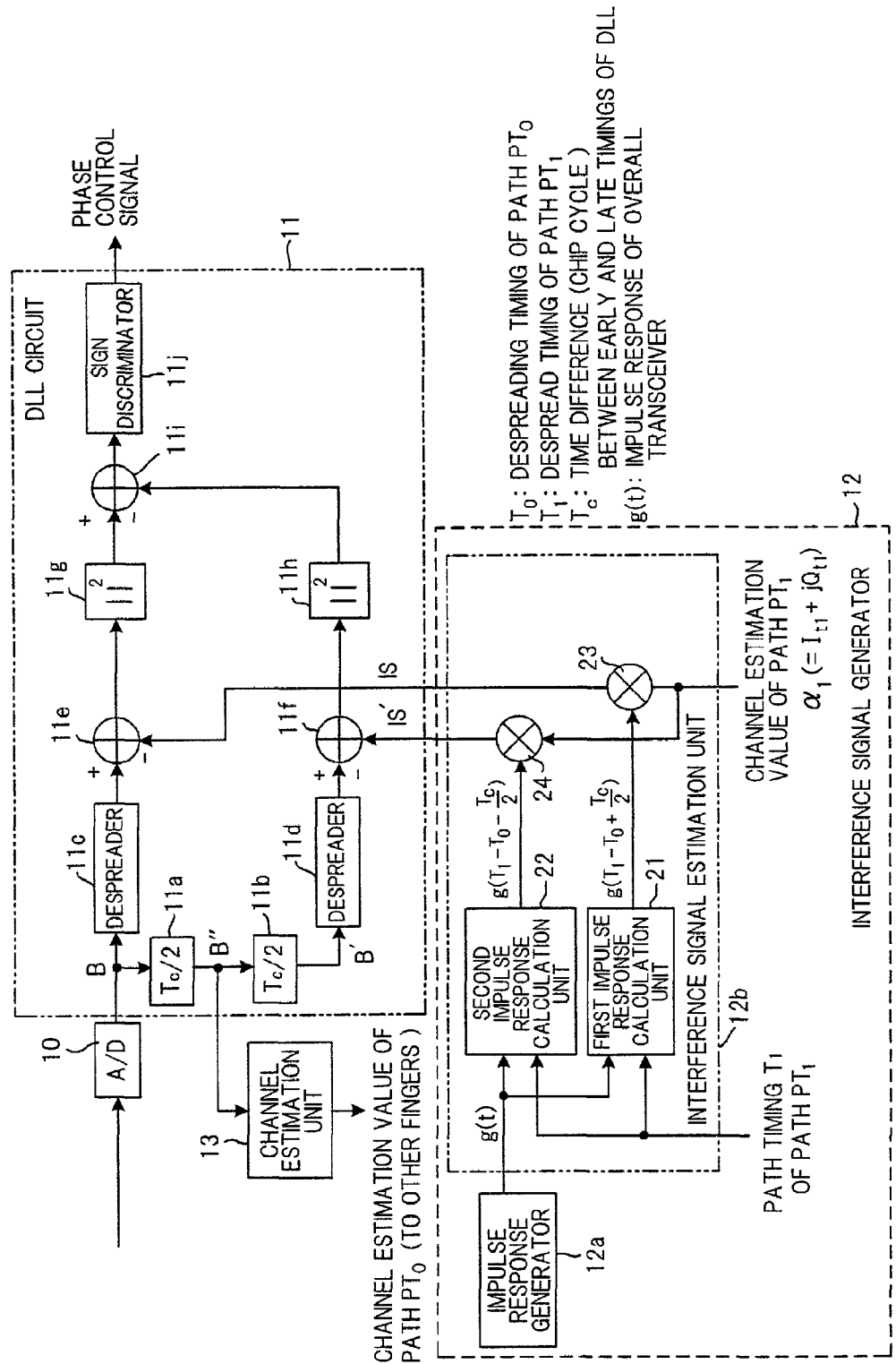
FIG. 6 is a block diagram illustrating a second embodiment of a synchronization tracking circuit according to the present invention.

FIG. 6 is a block diagram illustrating a first embodiment of a synchronization tracking circuit according to the present invention. The second embodiment illustrates an example of a case where a single path interferes with a path of interest. Components shown in FIG. 6 identical with those of the first embodiment of FIG. 3 are designated by like reference characters.

Here the interference signal estimation unit 12b *includes a first impulse-response calculation unit 21 for calculating and outputting an impulse response value $g(T_1-T_0+T_c/2)$ at the early timing $(T_1-T_0+T_c/2)$, and a second impulse-response calculation unit 22 for calculating and outputting an impulse response value $g(T_1-T_0-T_c/2)$ at the late timing $(T_1-T_0-T_c/2)$.*

*The interference signal estimation unit 12b further includes a first multiplier 23 for multiplying the impulse response value $g(T_1-T_0+T_c/2)$ by the channel estimation value $\alpha_1$ of path $PT_1$ to produce the interference signal IS expressed by*

$$IS=\alpha_1 g(T_1-T_0+T_c/2)$$

This signal is input to the interference eliminating unit 11e. The interference signal estimation unit 12b *further includes a second multiplier 24 for multiplying the impulse response value $g(T_1-T_0-T_c/2)$ by the channel estimation value $\alpha_1$ of path $PT_1$ to produce the interference signal IS' expressed by*

$$IS'=\alpha_1 g(T_1-T_0-T_c/2)$$

This signal is input to the interference eliminating unit 11f. The interference eliminating unit 11e eliminates the interference from the other path by subtracting the interference signal IS from the despread signal of the early timing, and the interference eliminating unit 11f eliminates the interference from the other path by subtracting the interference signal IS' from the despread signal of the late timing. This is followed by performing DLL control that is similar to that of the first embodiment.

The second embodiment is such that if there is one path that interferes with the path of interest, the DLL circuit of the path $PT_0$ of interest performs DLL control using a signal from which interference inflicted by the interfering path $PT_1$ has been eliminated. This makes it possible to perform correct synchronization tracking control.

Figure 7:
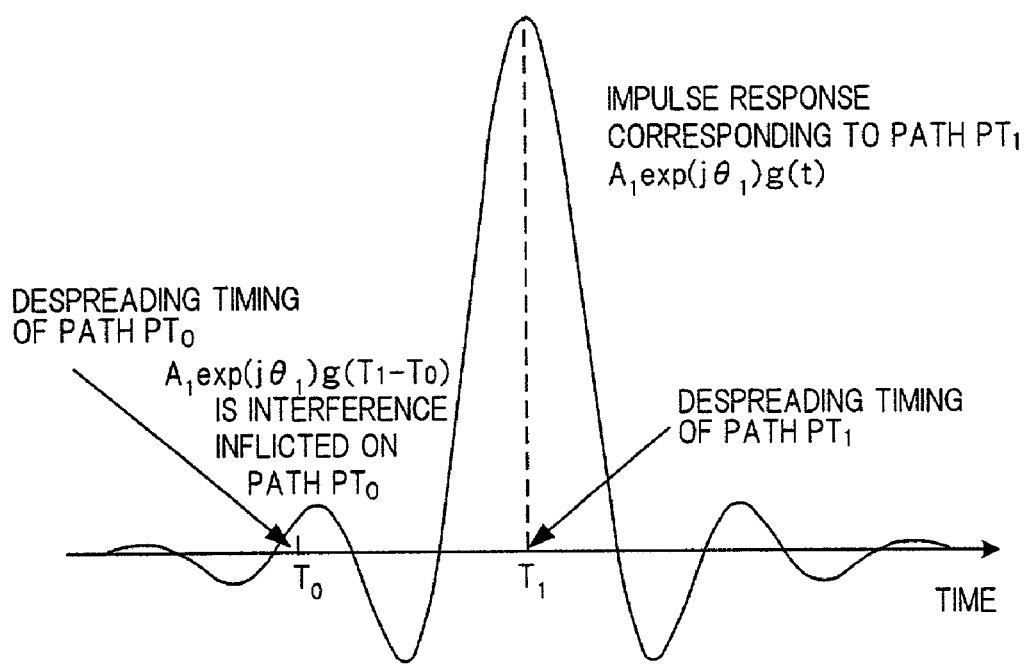
FIG. 7 is a diagram useful in describing an interference component.

FIG. 7 is a diagram useful in describing an interference component and illustrates the impulse response of path PT1. Here $T_1$ represents the despreading timing of path $PT_1$, $\theta_1$ the angle of phase rotation on path $PT_1$ $_{and\,A1}$ the attenuation [channel estimation value $\alpha_1=A_1\exp(j\theta_1)$] on this path, and $T_0$ the timing of despreading on path $PT_0$. The interference path $PT_1$ inflicts upon the path $PT_0$ of interest is the impulse response value at timing $T_0$. From FIG. 7, this is $$A_1\exp(j\theta_1)g(T_1-T_0)$$

The interference signals $I_s$, $I_s'$ at the early timing $(T_0-T_c/2)$ and late timing $(T_0+T_c/2)$, respectively, are as follows:

$$IS=A_1\exp(j\theta_1)g(T_1-T_0+T_c/2)$$

$$IS'=A_1\exp(j\theta_1)g(T_1-T_0-T_c/2)$$

(c) Alternative Construction of Impulse-response Generator

Figure 8:
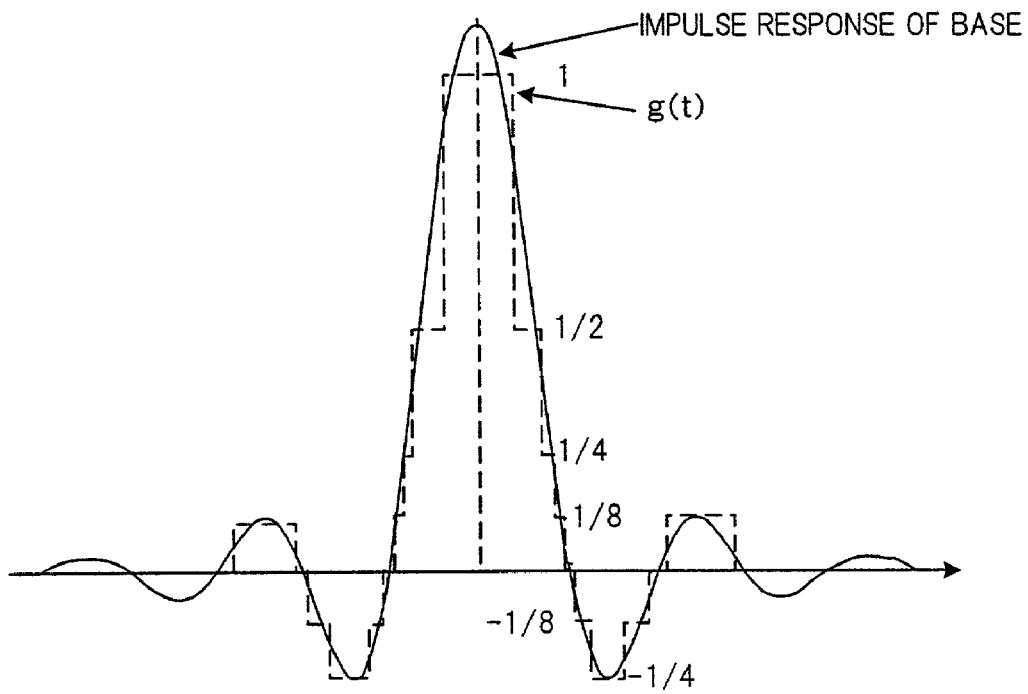
FIG. 8 is a diagram useful in describing the principles of impulse response generation according to another aspect.
Figure 9:
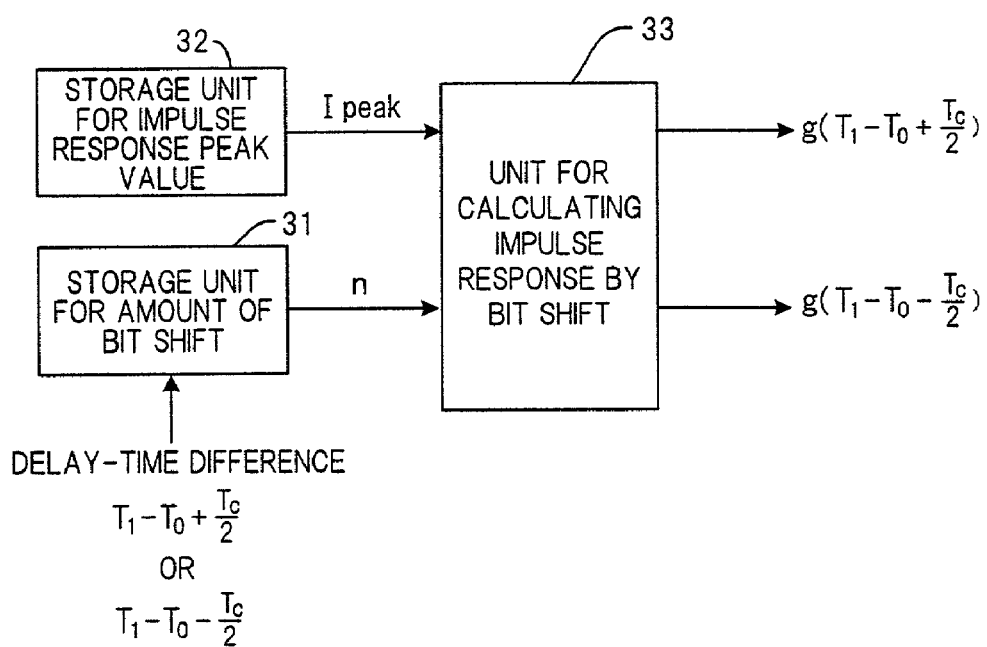
FIG. 9 is a block diagram illustrating the construction of another impulse-response generating unit.

FIG. 8 is a diagram useful in describing the principles of impulse response generation according to another aspect, and FIG. 9 is a diagram illustrating an another construction of the impulse response generator. In the first and second embodiments, the impulse response generator 12a stores the correspondence between times and impulse response values discretely in a storage unit such as a ROM or RAM, reads an impulse response value $g(T_1-T_0\pm T_c/2)$, which conforms to the delay time difference $(T_1-T_0\pm T_c/2)$, out of the storage unit, and outputs the impulse response value. According to such an implementation, however, a large-capacity memory is necessary to store the impulse response values.

Accordingly, the impulse response value at a predetermined time shown in FIG. 8 is approximated by $\frac{1}{2}^n$ of the peak value (where n is a positive integer), and the correspondence between time and n is stored in a storage unit (a bit-shift quantity storage unit) 31 discretely. Further, the peak value $I_{peak}$ of the impulse response is stored in a storage unit 32. An impulse-response calculation unit 33 obtains the n that corresponds to the delay time difference $(T_1-T_0\pm T_c/2)$, shifts the peak value $I_{peak}$ by n bits, calculates the impulse response value $g(T_1-T_0\pm T_c/2)$ and outputs the value. If this arrangement is adopted, the memory capacity required can be reduced.

(d) Third Embodiment

If the delay between paths in a multipath environment is large, the effect of other paths upon a path of interest is small. If the delay between paths is small, however, other paths do have a large influence upon the path of interest. In the third embodiment, therefore, the interference component is estimated and eliminated only in a case where the delay between paths is less than a threshold value.

Figure 10:
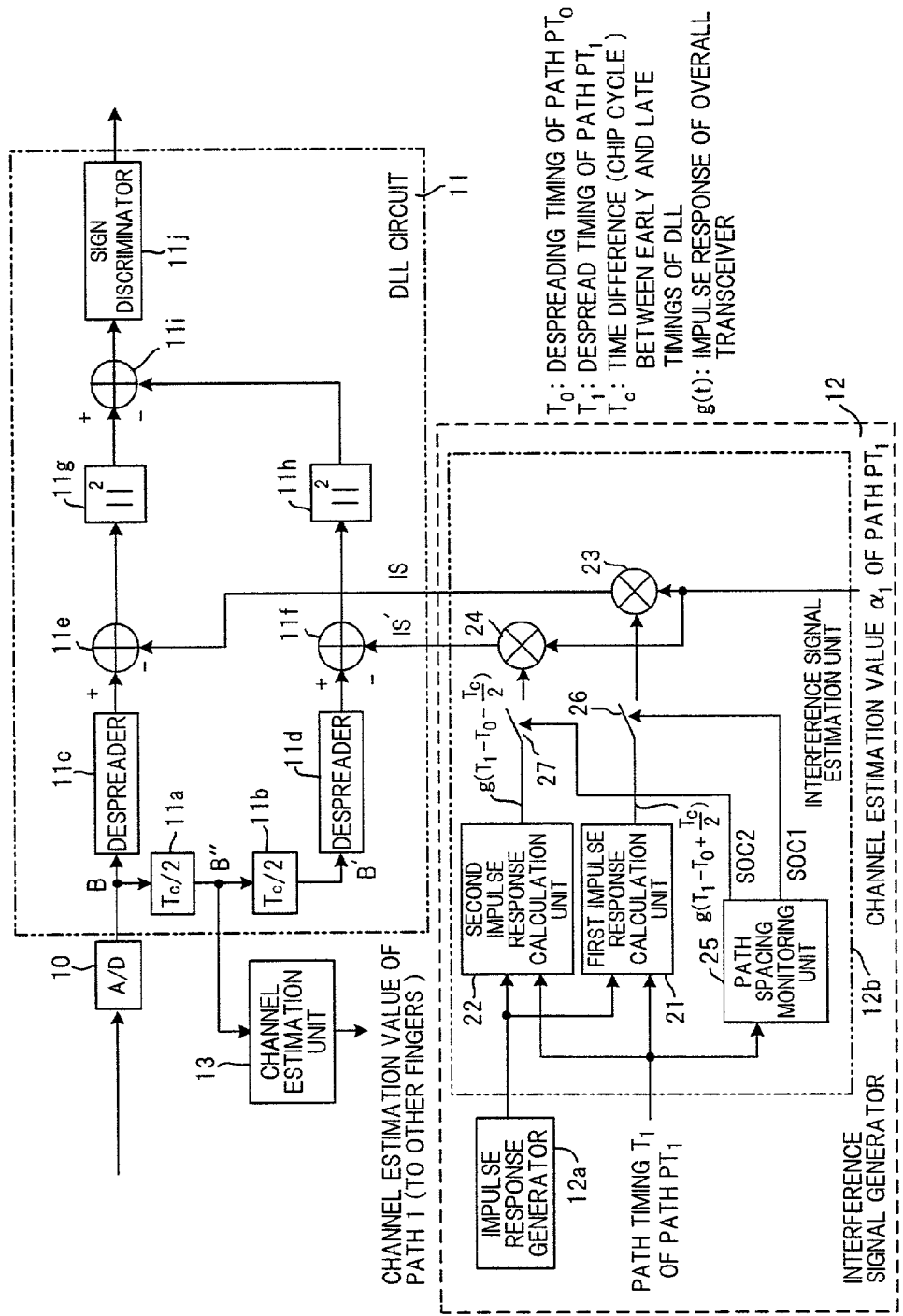
FIG. 10 is a block diagram illustrating a third embodiment of a synchronization tracking circuit according to the present invention.

FIG. 10 is a block diagram illustrating a third embodiment of a synchronization tracking circuit according to the present invention. Components shown in FIG. 10 identical with those of the second embodiment of FIG. 6 are designated by like reference characters. This embodiment differs from the second embodiment in the following respects:

(1) A path spacing monitoring unit 25 is provided. This unit obtains the time difference (interpath delay-time difference) between each of the early and late timings of the path $PT_0$ of interest and the path timing of path $PT_1$ compares the interpath delay-time difference with a set time $T_s$ and outputs switch open/close signals SOC1, SOC2 based upon the comparison.

(2) Switches 26, 27, which are opened/closed by the switch open/close signals SOC1, SOC2, respectively, are provided.

More specifically, the path spacing monitoring unit 25 (1) outputs the switch open/close signal SC01 the logic level whereof is high when the interval (=$T_1-T_0+T_c/2$) between the early timing of the path $PT_0$ of interest and the path timing of the path $PT_1$ is equal to or less than the set time $T_s$, and (2) outputs the switch open/close signal SC01 the logic level whereof is low when the interval(=$T_1-T_0+T_c/2$) is greater than the set time $T_s$. Further, the path spacing monitoring unit 25 (1) outputs the switch open/close signal SC02 the logic level whereof is high when the interval (=$T_1-T_{0-Tc}/2$) between the late timing of the path $PT_0$ of interest and the path timing of the path $PT_1$ is equal to or less than the set time $T_s$, and (2) outputs the switch open/close signal SC02 the logic level whereof is low when the interval (=$T_1-T_0-T_c/2$) is greater than the set time $T_s$.

The switch 26 (1) closes when the switch open/close signal SC01 is at the high level (=$T_1-T_0+T_c/2 \leq T_s$), thereby inputting the impulse response value $g(T_1-T_0+T_c/2)$ to a multiplier 23, and (2) opens when the switch open/close signal SC01 is at the low level (=$T_1-T_0+T_c/2>T_s$), thereby inputting zero to a multiplier 23. Further, the switch 27 (1) closes when the switch open/close signal SC02 is at the high level (=$T_1-T_0-T_c/2 \leq T_s$), thereby inputting the impulse response value $g(T_1-T_0-T_c/2)$ to a multiplier 24, and (2) opens when the switch open/close signal SC02 is at the low level (=$T_1-T_0-T_c/2>T_s$), thereby inputting zero to a multiplier 24.

Thus, if the delay-time difference between paths is small and, hence, the switch open/close signal SC01 is at the high level (i.e., when $T_1-T_0+T_c/2<T_s$ holds), the multiplier 23 inputs the interference signal Is=$\alpha_1 g(T_1-T_0+T_c/2)$ to the DLL circuit 11, and the latter performs DLL control upon eliminating the interference component IS. However, if the delay-time difference between paths is large and, hence, the switch open/close signal SC01 is at the low level (i.e., when $T_1-T_0+T_c/2>T_s$ holds), the multiplier 23 outputs an interference signal IS that is equal to zero. As a result, the DLL circuit 11 performs DLL control without eliminating the interference component.

Further, if the delay-time difference between paths is small and, hence, the switch open/close signal SC02 is at the high level (i.e., when $T_1-T_0-T_c/2<T_s$ holds), the multiplier 24 inputs the interference signal IS'=$\alpha_1 g(T_1-T_0-T_c/2)$ to the DLL circuit 11, and the latter performs DLL control upon eliminating the interference component IS'. However, if the delay-time difference between paths is large and, hence, the switch open/close signal SC02 is at the low level (i.e., when $T_1-T_0-T_c/2>T_s$ holds), the multiplier 24 outputs an interference signal IS' that is equal to zero. As a result, the DLL circuit 11 performs DLL control without eliminating the interference component.

The foregoing is for a case where there is one path that interferes with the path of interest. However, control can be performed in a similar manner also in cases where multiple path interfere with the path of interest.

In accordance with the third embodiment, therefore, an interference component is eliminated only if the interference component is large, thereby making it possible to perform correct synchronization tracking.

(e) Fourth Embodiment

In a multipath environment, the phases of delayed waves differ from one another. Accordingly, highly precise synchronization tracking can be achieved if DLL control is performed so as to find the difference between signals obtained eliminating an interference signal from each of the despread signals of both the early and late timings, rotating phase using a channel estimation value and deciding advance/delay based upon the sign (positive or negative) of this signal.

Figure 11:
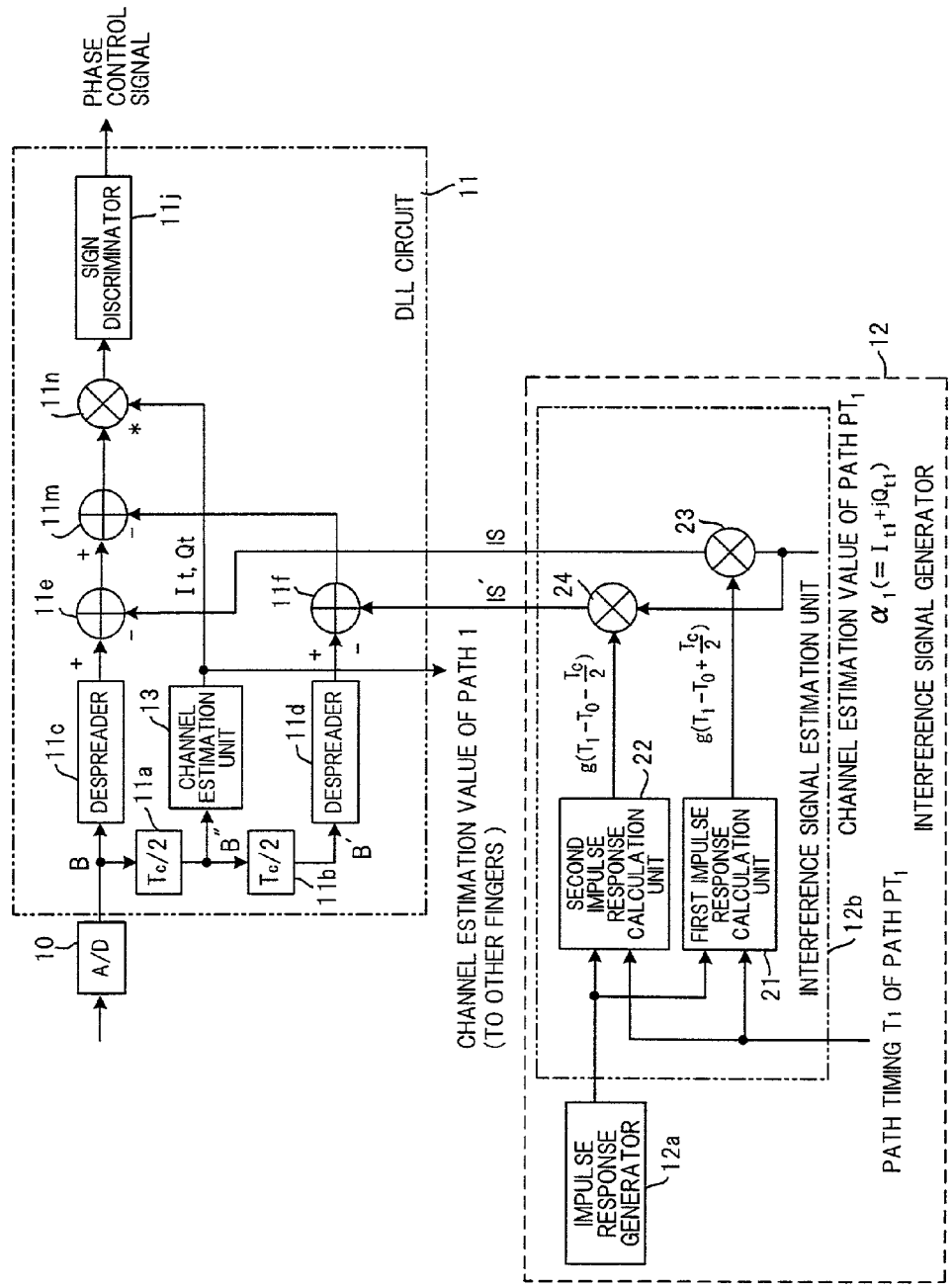
FIG. 11 is a block diagram illustrating a fourth embodiment of a synchronization tracking circuit according to the present invention.
Figure 12:
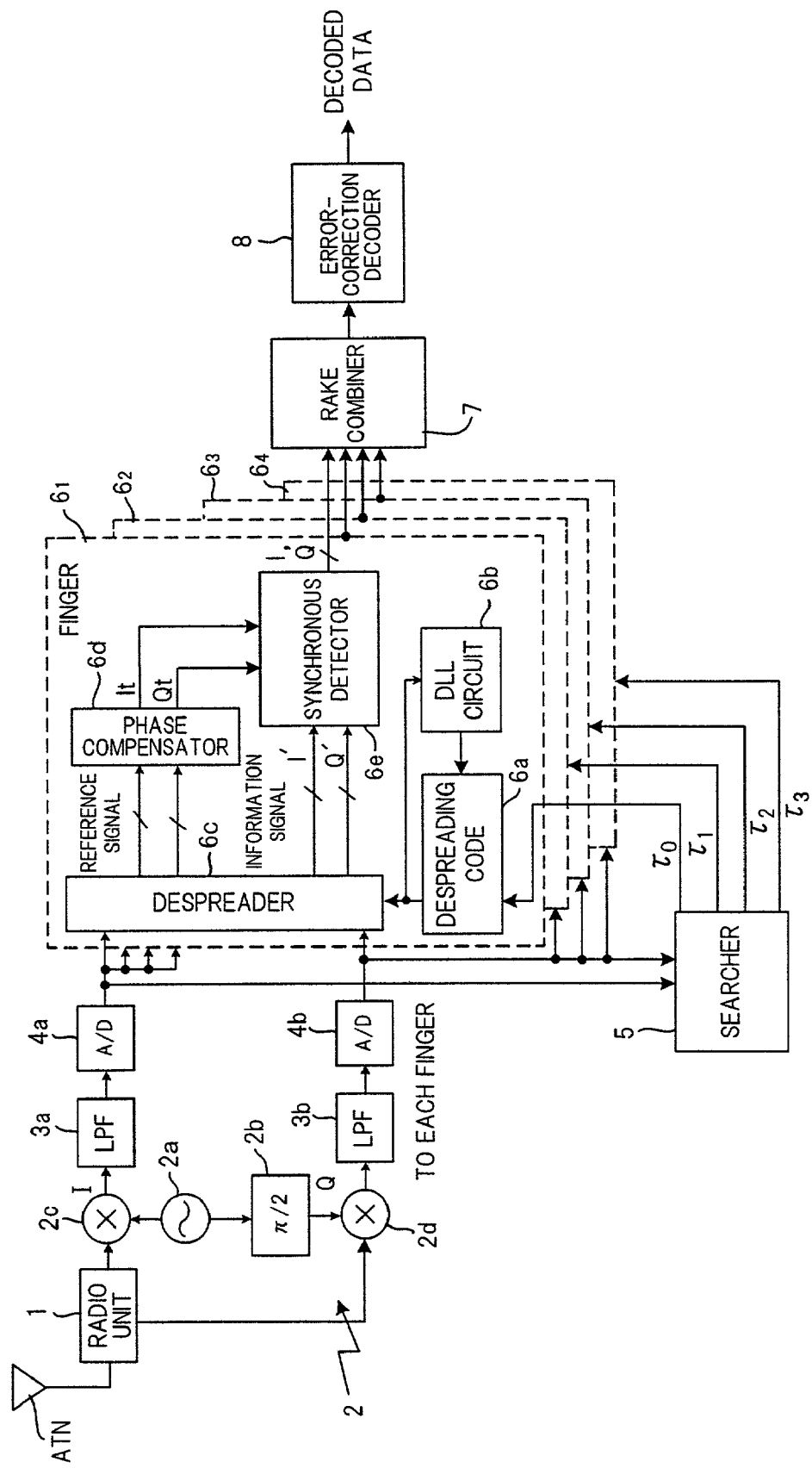
FIG. 12 is a block diagram of a CDMA receiver according to the prior art.
Figure 13:
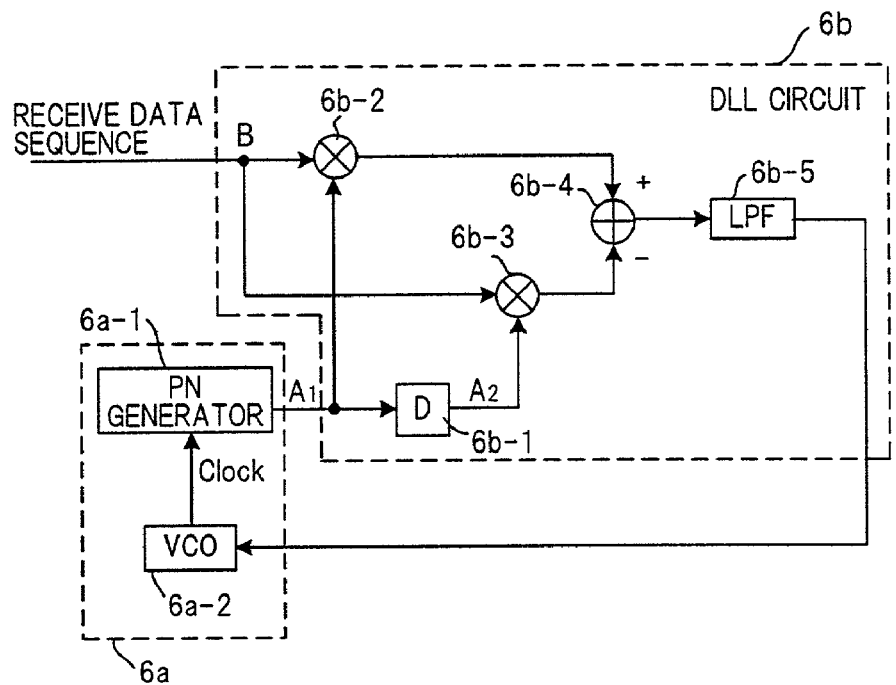
FIG. 13 is a block diagram of a DLL circuit according to the prior art.
Figure 14:
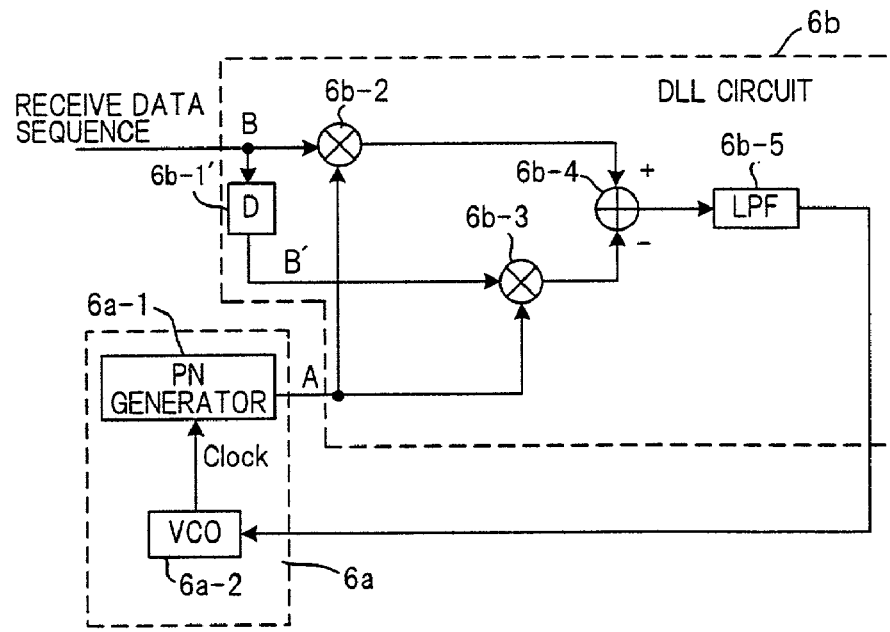
FIG. 14 is a block diagram of another example of a DLL circuit according to the prior art.
Figure 15A:
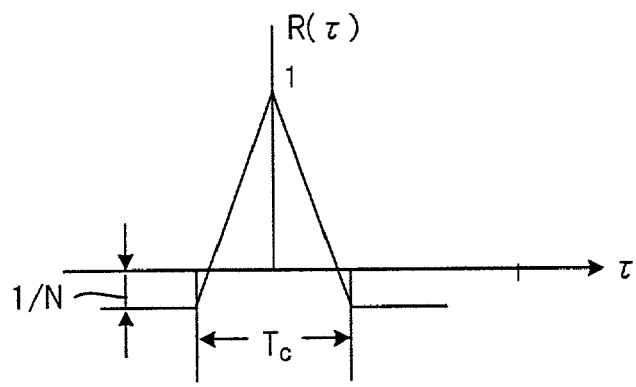
FIGS. 15A, 15B and 15C are diagrams useful in describing S curves in DLL control according to the prior art.
Figure 15B:
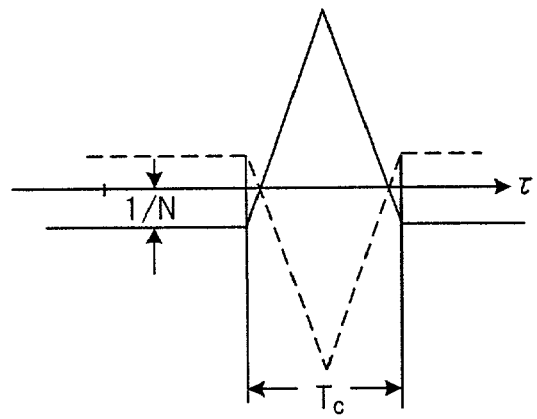
Figure 15C:
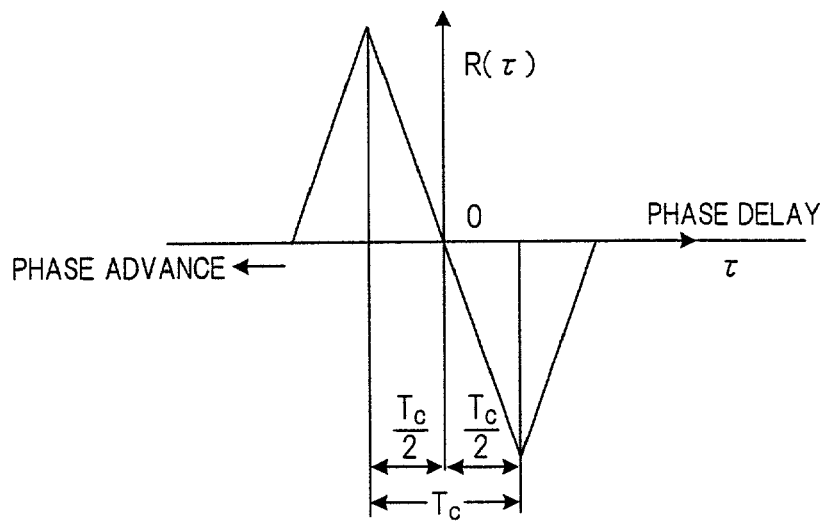
Figure 16:
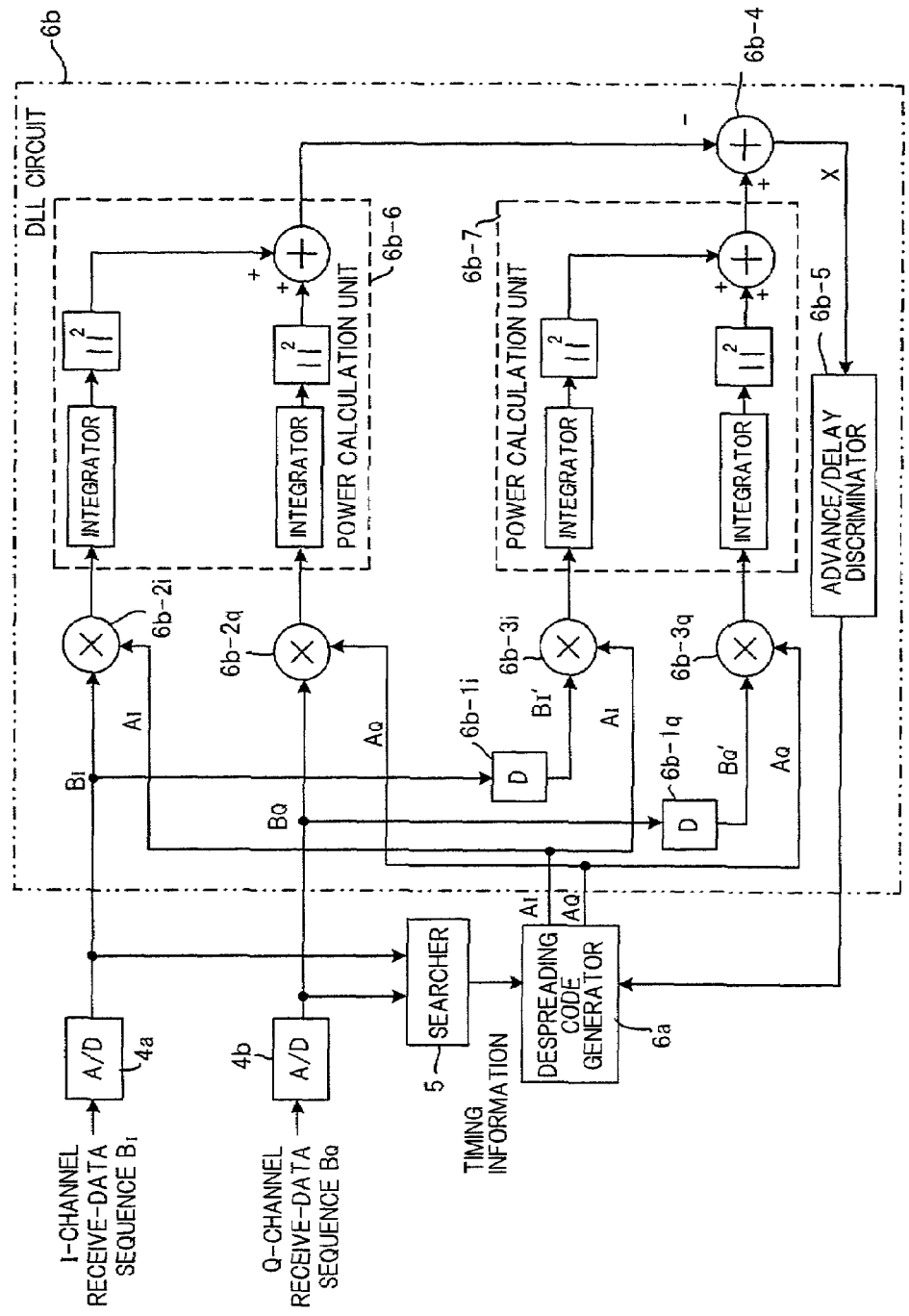
FIG. 16 is a diagram showing the construction of a prior-art DLL circuit that takes I and Q channels into account.

FIG. 11 is a block diagram illustrating a fourth embodiment of such a synchronization tracking circuit. Components shown in FIG. 11 identical with those of the second embodiment of FIG. 6 are designated by like reference characters. This embodiment differs from the second embodiment in that the phase of a despread signal from which an interference signal has been eliminated is rotated using a channel estimation value and the phase control signal PCS is output in accordance with the sign of the signal obtained by phase rotation.

An arithmetic unit 11m obtains, by complex calculation, the difference between despread signals of the early and late timings from which an interference signal has been eliminated by the interference eliminating units 11e, 11f, and outputs a complex signal representing this difference. A phase rotation unit 11n uses the channel estimation values It, Qt, which are output by the channel estimation unit 13, to rotate the phase of the complex signal output from the arithmetic unit 11m. The sign discrimination unit 11j outputs the phase control signal PCS based upon the sign of the I component of the complex signal obtained by phase rotation.

In accordance with the fourth embodiment, phase rotation is performed using a channel estimation signal and phase advance/delay is judged based upon the signal of the signal obtained by this phase rotation. This makes possible highly precise synchronization tracking.

Thus, in accordance with the present invention, DLL control is performed upon eliminating an interference component that another path inflicts upon a path of interest in a multipath environment. As a result, correct synchronization tracking can be carried out.

Further, in accordance with the present invention, an interference component is estimated correctly based upon (1) a channel estimation value of the other path, (2) a path-to-path delay-time difference between the other path and the path of interest, and (3) impulse response of the overall transceiver. The effects of this interference component can be eliminated.

Further, in accordance with the present invention, the impulse response value is approximated by $\frac{1}{2}^n$ of the peak value (where n is a positive integer), the correspondence between time and n is stored discretely and the impulse response value is calculated upon shifting the peak value by n bits. As a result, the required memory capacity of the impulse response generator can be reduced.

Further, in accordance with the present invention, phase is rotated using a channel estimation value and phase advance/delay is discriminated based upon the sign of the signal obtained by phase rotation. This makes it possible to perform highly precise synchronization tracking.

As many apparently widely different embodiments of the present invention can be made without departing from the spirit and scope thereof, it is to be understood that the invention is not limited to the specific embodiments thereof except as defined in the appended claims.

What is claimed is:

1. A synchronization tracking circuit for synchronizing the phase of a despreading code sequence on a receiving side to the phase of a spreading code sequence on a transmitting side, comprising:
a despreading code sequence generator for generating a despreading code sequence on the receiving side;
a despreader for generating first and second despread signals by despreading a receive signal by the despreading code sequence on the receiving side at a first timing, that leads by a predetermined phase, timing of the spreading code sequence on the transmitting side and a second timing that lags, by the predetermined phase, the timing of said spreading code sequence;
an interference-componenet estimation unit for estimating first and second interference components at said first and second timings inflicted by another path upon a prescribed path of interest among multiple paths;
an interference-component elimination unit for eliminating the first and second interference components respectively from said first and second despread signals; and
a phase control signal generator for generating a signal for controlling the phase of the despreading code sequence on the receiving side based upon the first and second despread signals from which the first and second interference components have been eliminated respectively.

2. The circuit according to claim 1, wherein said interference-component estimation unit estimates the first and second interference components inflicted by the other path upon a prescribed pat of interest based upon a channel estimation value of the other path, an interpath delay time difference between the other path and the path of interest at said first and second timings, and impulse response of the overall transceiver.

3. The circuit according to claim 1, wherein said interference-component elimination unit eliminates only an interference component from another path for which a path-to-path delay-time difference between this other path and the path of interest is less than a threshold value.

4. The circuit according to claim 2, further comprising an impulse response generator for storing impulse response values discretely and outputting an impulse response value that corresponds to an interpath delay-time difference;
wherein said impulse response generator approximates an impulse response value by $1/2^n$ of a peak value (where n is a positive integer) and includes:
a storage unit for storing correspondence between time and n discretely; and
an arithmetic unit for obtaining n of a time that conforms to the interpath delay-time difference and calculating an impulse response value upon shifting the pea value by n bits.

5. The circuit according to claim 1, wherein said phase control signal generator obtains the power of the first and second despread signals from which the interference components have been eliminated and generates a signal for controlling the phase of the despreading code sequence on the receiving side based upon a difference between the powers obtained.

6. The circuit according to claim 1, wherein said phase control signal generator rotates, on the basis of a channel estimation value of the pah of interest, phase of a difference signal between said first and second despread signals from which the first and second interference components have been eliminated respectively and generates the signal for controlling the phase of the despreading code sequence on the receiving side based upon said signal obtained by the phase rotation.

* * * * *